United States Patent
Pau et al.

(10) Patent No.: US 10,785,810 B2
(45) Date of Patent: Sep. 22, 2020

(54) METHOD AND SYSTEM FOR ESTABLISHING AN INTERNET ACCESS BY USING A WIRELESS LOCAL AREA NETWORK COMMUNICATION PROTOCOL FROM A MOBILE CLIENT STATION

(71) Applicant: SORBONNE UNIVERSITE, Paris (FR)

(72) Inventors: Giovanni Pau, Paris (FR); Davide Pesavento, Ivry-sur-Seine (FR); Serge Fdida, Alfortville (FR)

(73) Assignee: SORBONNE UNIVERSITE, Paris (FR)

( * ) Notice: Subject to any disclaimer, the term of this patent is extended or adjusted under 35 U.S.C. 154(b) by 0 days.

(21) Appl. No.: 15/758,195

(22) PCT Filed: Sep. 6, 2016

(86) PCT No.: PCT/FR2016/052205
§ 371 (c)(1),
(2) Date: Mar. 7, 2018

(87) PCT Pub. No.: WO2017/042468
PCT Pub. Date: Mar. 16, 2017

(65) Prior Publication Data
US 2018/0249514 A1    Aug. 30, 2018

(30) Foreign Application Priority Data
Sep. 7, 2015   (FR) ...................................... 15 58266

(51) Int. Cl.
*H04W 76/10* (2018.01)
*G06F 16/958* (2019.01)
(Continued)

(52) U.S. Cl.
CPC .......... *H04W 76/10* (2018.02); *G06F 16/958* (2019.01); *H04L 41/08* (2013.01);
(Continued)

(58) Field of Classification Search
None
See application file for complete search history.

(56) References Cited

U.S. PATENT DOCUMENTS 8,665,847 B2    3/2014  Holostov et al.
9,628,359 B1 *  4/2017  Jain ..................... H04L 43/0811
(Continued)

FOREIGN PATENT DOCUMENTS

FR    2 993 744 A1    1/2014

OTHER PUBLICATIONS

International Search Report dated Nov. 25, 2016 in PCT/FR2016/052205 filed Sep. 6, 2016.
(Continued)

*Primary Examiner* — James P Duffy
(74) *Attorney, Agent, or Firm* — Oblon, McClelland, Maier & Neustadt, L.L.P.

(57) ABSTRACT

A method for establishing an Internet access by using a WLAN protocol from a mobile client station, via an access point to be chosen from a set of identified access points, includes: providing a general database of the identified access points with connection information; requesting Internet access using the protocol, successively moving through browsing through, selecting, associating, authenticating and configuring; establishing the Internet access of the mobile client station via the selected access point. Before and independently of the requesting the Internet access, connection information of at least a portion of the access points of the general database is downloaded into an onboard database of the mobile client station. The browsing through and
(Continued)

selecting are carried out based on the downloaded connection information, without soliciting the general database and the identified access points.

16 Claims, 2 Drawing Sheets

(51) Int. Cl.

| | |
|---|---|
| H04W 84/12 | (2009.01) |
| H04W 48/20 | (2009.01) |
| H04L 12/24 | (2006.01) |
| H04W 60/00 | (2009.01) |
| H04L 29/08 | (2006.01) |
| H04L 29/12 | (2006.01) |
| H04W 12/06 | (2009.01) |
| H04W 24/08 | (2009.01) |
| H04W 48/14 | (2009.01) |
| H04W 4/40 | (2018.01) |
| H04W 88/08 | (2009.01) |

(52) U.S. Cl.
CPC ...... *H04L 41/0806* (2013.01); *H04L 61/2015* (2013.01); *H04L 67/34* (2013.01); *H04W 12/06* (2013.01); *H04W 24/08* (2013.01); *H04W 48/20* (2013.01); *H04W 60/00* (2013.01); *H04W 84/12* (2013.01); *H04L 67/12* (2013.01); *H04W 4/40* (2018.02); *H04W 48/14* (2013.01); *H04W 88/08* (2013.01)

(56) References Cited

U.S. PATENT DOCUMENTS

| | | | |
|---|---|---|---|
| 2004/0127252 | A1 | 7/2004 | Tsunomoto et al. |
| 2005/0138178 | A1 | 6/2005 | Astarabadi |
| 2014/0295762 | A1* | 10/2014 | Jung ............ H04W 48/16 455/41.2 |
| 2015/0208227 | A1 | 7/2015 | El Moumouhi et al. |

OTHER PUBLICATIONS

Deshpande, Pralhad et al., "Predictive Methods for Improved Vehicular WiFi Access," MobiSys'09, Jun. 22-25, 2009, 14 pages.

* cited by examiner

*Figure 1*

METHOD AND SYSTEM FOR ESTABLISHING AN INTERNET ACCESS BY USING A WIRELESS LOCAL AREA NETWORK COMMUNICATION PROTOCOL FROM A MOBILE CLIENT STATION

The present invention relates to a method for establishing Internet access by using a wireless local area network communication protocol from a mobile client station, via an access point to be chosen from a set of identified Internet access points using this protocol. It also relates to a corresponding computer program and system.

"Wireless local area network communication protocol" means a WLAN (from "Wireless Local Area Network") protocol.

More specifically, the invention applies to a method comprising the following steps:
   a general database containing all of the identified access points with connection information specific to each access point is provided,
   the mobile client station requests Internet access by using said protocol, successively moving through the following phases: browsing through at least a portion of the identified access points in order to list those detected as accessible by the mobile client station; selecting one of the access points previously listed; requesting an association of the mobile client station with the selected access point; authenticating the mobile client station in the access point that was just associated with it; configuring IP parameters of the mobile client station,
   the Internet access of the mobile client station is established via the selected access point using the IP parameters configured.

Methods of this type are known, in particular those implementing one of the wireless local area network communication protocols normalized by the group IEEE 802.11, usually called Wi-Fi protocols (registered trademark).

Such a method is for example disclosed in the U.S. Pat. No. 8,665,847 B2, which relates to Wi-Fi access to the Internet from a mobile client station. A general database storing attribute values of Wi-Fi access points, locally partially downloadable via the Internet into the mobile client station via a cache mechanism, is provided. This means precisely that during and depending on a step of requesting Internet access carried out by the mobile client station, certain data of the general database can be downloaded into cache when it is used to optimize the phase of selecting a Wi-Fi access point. This results in optimized but not necessarily very fast Wi-Fi access to the Internet.

Such a method is also disclosed in the article by Deshpande et al, entitled "Predictive methods for improved vehicular WiFi access", published in the Proceedings of the conference MobiSys'09, 22-25 Jun. 2009, Krakow (PL). It relates more specifically to Wi-Fi access to the Internet from a mobile client station on board a motor vehicle. It is intended for it to be possible to locally download, in the mobile client station, data relating to potential access points, in particular via a data-collection and cache mechanism. This also results in optimized but not necessarily very fast Wi-Fi access to the Internet.

It may thus be desired to provide a method for establishing Internet access by using a wireless local area network communication protocol from a mobile client station that allows at least part of the aforementioned problems and constraints to be avoided.

Therefore, a method of the aforementioned type is proposed, wherein:
   before the step of requesting the Internet access by using said protocol and independently of this step, the mobile client station downloads the connection information of at least a portion of the access points of the general database into an onboard database of the mobile client station, and
   the phases of browsing through and selecting are carried out on the basis of the previously downloaded connection information in the onboard database of the mobile client station, without soliciting the general database and the identified access points.

Thus, by decorrelating, in this context, the downloading of data from the general database from the various phases of the request for Internet access, and by eliminating all access to the general database and to the access points during the two first phases of the request for Internet access, the latter is significantly accelerated.

Optionally, the connection information specific to each identified access point in the general database comprises at least:
   a location or geographic coverage area of the access point in question,
   a preferred communication channel of the access point in question according to said protocol, and
   performance characteristics of the access point in question.

Also optionally:
   the identified access points in the general database are divided into predetermined classes, the number of which is strictly less than the number of identified access points,
   the selection phase comprises the selection of a class, then the selection of an access point from this class among the access points listed on the basis of the previously downloaded connection information in the onboard database of the mobile client station, and
   the selection of an access point in the selected class is done randomly, pseudo-randomly or on the basis of information on loads of the access points listed.

Also optionally, a method for establishing Internet access according to the invention can further comprise, when the Internet access of the mobile client station via the selected access point has been established, the following steps:
   measuring performance characteristics of the selected access point on the basis of this established access, and
   transmitting the performance characteristics measured to the general database for an update.

Also optionally, the phases of authentication and of configuration of the IP parameters involve the use of parameters of time outs that are defined in such a way as to always be less than or equal to 5 seconds, in particular times for returns, called backoff times and defined in the phase of configuring the IP parameters in such a way as to further remain constant.

Also optionally:
   the phase of configuring the IP parameters itself comprises four steps: broadcasting, then proposing an IP address, then requesting the IP address proposed, then acknowledgement, and
   during the first execution of this phase of configuring the IP parameters in the request for access, the two first steps of broadcasting and proposing an IP address are not carried out, the step of requesting the proposed IP address being based on an IP address assigned during a previous request for access.

Also optionally, the wireless local area network communication protocol is one of the protocols normalized by the group IEEE 802.11.

Also optionally, the configuration of the IP parameters of the mobile client station is carried out using the DHCP protocol.

A computer program that can be downloaded from a communication network and/or recorded on a medium that can be read by a computer and/or executed by a processor is also proposed, said computer program comprising instructions for the execution of the following steps of a method for establishing Internet access by using a wireless local area network communication protocol from a mobile client station, via an access point to be chosen from a set of identified Internet access points using this protocol, when said program is executed on a processor of said mobile client station:

requesting Internet access for the mobile client station by using said protocol, by successively moving through the following phases: browsing through at least a portion of the identified access points in order to list those detected as accessible by the mobile client station; selecting one of the access points previously listed; requesting an association of the mobile client station with the selected access point; authenticating the mobile client station in the access point that was just associated with it; configuring IP parameters of the mobile client station, participating in establishment of the Internet access of the mobile client station via the selected access point based on the IP parameters configured, this computer program further comprising instructions for carrying out the following steps:

before the step of requesting the Internet access by using said protocol and independently of this step, downloading, for the mobile client station, the connection information of at least a portion of the access points of the general database into an onboard database of the mobile client station, and going through the browsing and selecting phases on the basis of the previously downloaded connection information in the onboard database of the mobile client station, without soliciting the general database and the identified access points.

A system for establishing an Internet access by using a wireless local area network communication protocol from a mobile client station, via an access point to be chosen from a set of identified Internet access points using this protocol, is also proposed, the system comprising:

a general database, accessible via the Internet, containing all of the identified access points with connection information specific to each access point, at least one mobile client station comprising a processor and:

an onboard database, in its onboard database, a manager of downloading of the connection information of at least a portion of the access points in the general database, a manager of Internet access programmed to, when it is executed, request Internet access by using said protocol, successively moving through the following phases: browsing through at least a portion of the identified access points in order to list those detected as accessible by the mobile client station; selecting one of the access points previously listed; requesting an association of the mobile client station with the selected access point; authenticating the mobile client station in the access point that was just associated with it; configuring IP parameters of the mobile client station, an Internet server programmed to establish the Internet access of the mobile client station via the selected access point based on the IP parameters configured, wherein the processor of the mobile client station is further programmed to sequence the execution of the download manager and of the Internet access manager in the following manner:

executing the download manager independently of and before execution of the Internet access manager, executing the Internet access manager by moving through the phases of browsing and selecting on the basis of the connection information in the onboard database of the mobile client station previously downloaded by the download manager, without soliciting the general database and the identified access points.

The invention will be better understood with the following description, given only as an example and in reference to the appended drawings in which.

Figure 1:
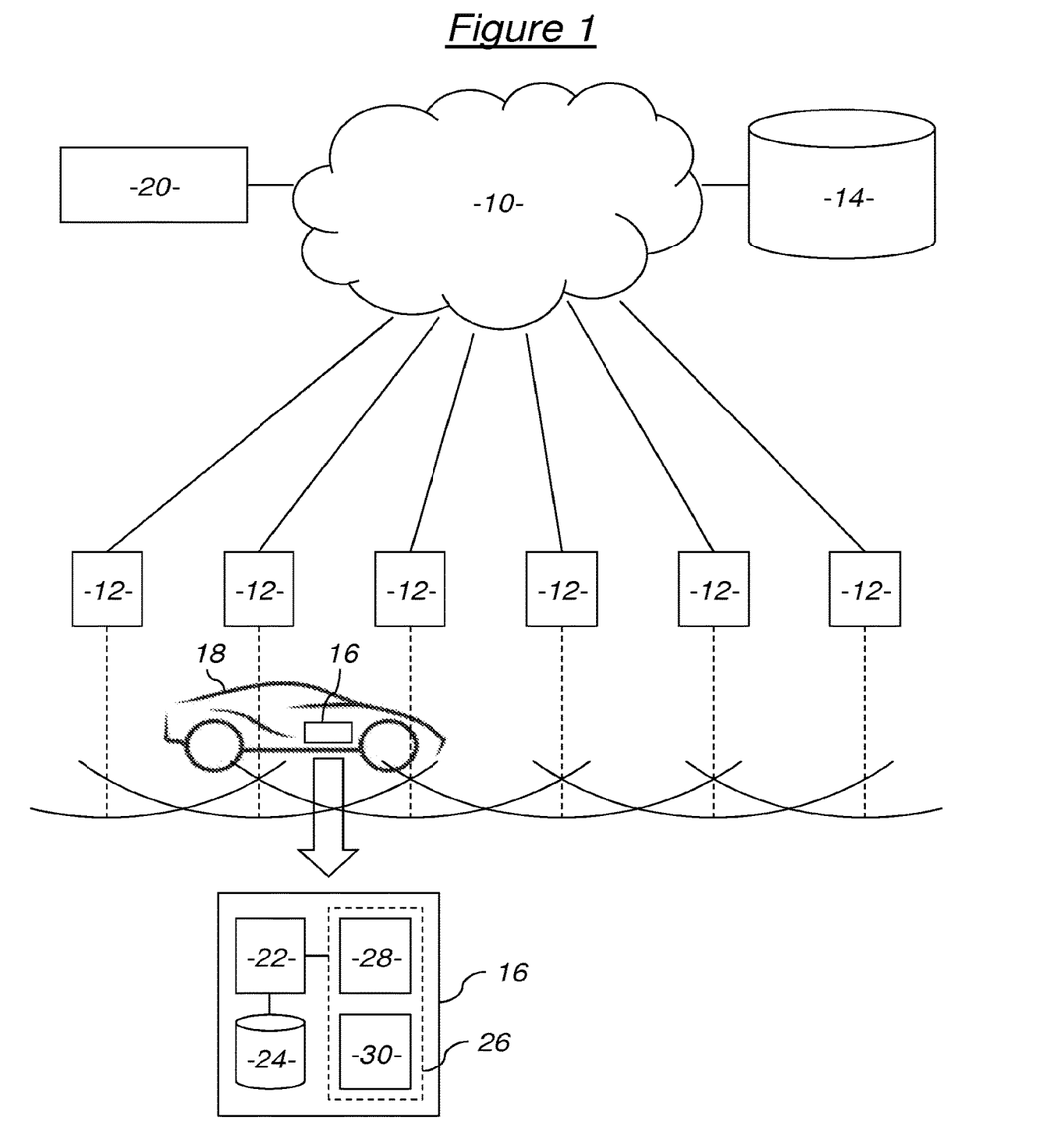
FIG. 1 schematically shows the general structure of a system for establishing Internet access by using a wireless local area network communication protocol from a mobile client station, according to an embodiment of the invention.

The system schematically shown in FIG. 1, made for establishing access to the Internet (designated by the reference 10) by using a wireless local area network communication protocol (i.e. a WLAN protocol) from one or more client stations, via an access point to be chosen from a set of identified Internet access points 12 using this WLAN protocol, comprises:

a general database 14, accessible via the Internet 10, containing all of the identified access points 12 with connection information specific to each access point, at least one mobile client station 16, for example on board a motor vehicle 18, and an Internet server 20 programmed to establish the Internet access of the mobile client station 16 via an access point selected from the set of identified Internet access points 12 on the basis of the IP (from "Internet Protocol") parameters configured for the mobile client station 16.

The WLAN protocol intended in the example illustrated in FIG. 1 is for example a Wi-Fi protocol from the group IEEE 802.11. It should be noted that the Wi-Fi access points of the set of identified access points 12 can be managed by one or more providers of Wi-Fi access to the Internet, with or without requiring a username and password.

The mobile client station 16 as shown schematically in FIG. 1, for example a laptop computer, a mobile telephone or any other personal digital assistant, comprises a processor 22 associated in a conventional way with a memory, for example a RAM memory. This memory functionally comprises an onboard database 24 and a zone 26 for storing computer programs 28 and 30 that can be executed by the processor 22. It should be noted that the computer programs 28 and 30 are shown as distinct, but this distinction is purely functional. They could also be grouped together in any possible combination into one or more pieces of software. Their functions could also be at least partly microprogrammed or microwired in dedicated integrated circuits. Thus, alternatively, the mobile client station 16 implementing the processor 22 and its associated RAM memory could be replaced by an electronic device consisting solely of digital circuits (without a computer program) for carrying out the same actions.

More precisely, the computer program 28 carries out a function of manager of downloading, into the onboard database 24, the connection information of at least a portion of the identified access points of the general database 14.

Also more precisely, the computer program 30 carries out a function of manager of Internet access 10 programmed to, when it is executed, request Internet access by using the aforementioned Wi-Fi protocol, successively moving through the following phases: browsing through at least a portion of the identified access points 12 in order to list those detected as accessible by the mobile client station 16; selecting one of the access points previously listed; requesting an association of the mobile client station 16 with the selected access point; authenticating the mobile client station 16 in the access point that was just associated with it; configuring IP parameters of the mobile client station 16. The last configuration phase can for example be carried out using the DHCP (from "Dynamic Host Configuration Protocol") protocol or equivalent.

According to the invention, the processor 22 is programmed to sequence the execution of the download manager 28 and of the Internet 10 access manager 30 in the following manner:
  executing the download manager 28 independently of and before execution of the Internet access 10 manager 30,
  executing the Internet 10 access manager 30 by moving through the phases of browsing and selecting the Wi-Fi protocol on the basis of the previously downloaded connection information in the onboard database 24, without soliciting the general database 14 and the identified access points 12.

The processor 22 is also programmed in a manner known per se in order to participate in establishment of the Internet 10 access of the mobile client station 16 via the access point selected by the manager 30.

During this Internet access and optionally, performance characteristics of the selected access point can be measured, for example by the manager 30 or by the Internet server 20. These features are then advantageously transmitted to the general database 14 for an update of that which it contains as connection information related to this selected access point. Since the system is suitable for being contacted at every instant and simultaneously by a plurality of mobile client stations, via a plurality of identified access points, this allows dynamic management of the entire contents of the general database 14 to be provided, via learning or permanent feedback.

The connection information of all of the identified Internet access points 12 in the general database 14 comprises more precisely, for each access point, at least:
  an identifier, for example BSSID (from "Basic Service Set IDentifier"), of the Wi-Fi access point in question,
  location or geographic coverage of the Wi-Fi access point in question,
  a preferred communication channel of the Wi-Fi access point in question when it establishes a connection, and
  performance characteristics of the Wi-Fi access point in question.

The performance characteristics are defined according to various metrics known per se for indicating a quality of service provided by the access point in question for a Wi-Fi connection. They comprise for example RTT (from "Round-Trip Time") travel times, temporal changes in these RTTs, an estimated bandwidth, a maximum throughput that can be reached, a classification according to a plurality of predetermined classes, the number of which is strictly less than the number of identified access points, etc. This list is, of course, neither exhaustive nor limiting.

Figure 2:
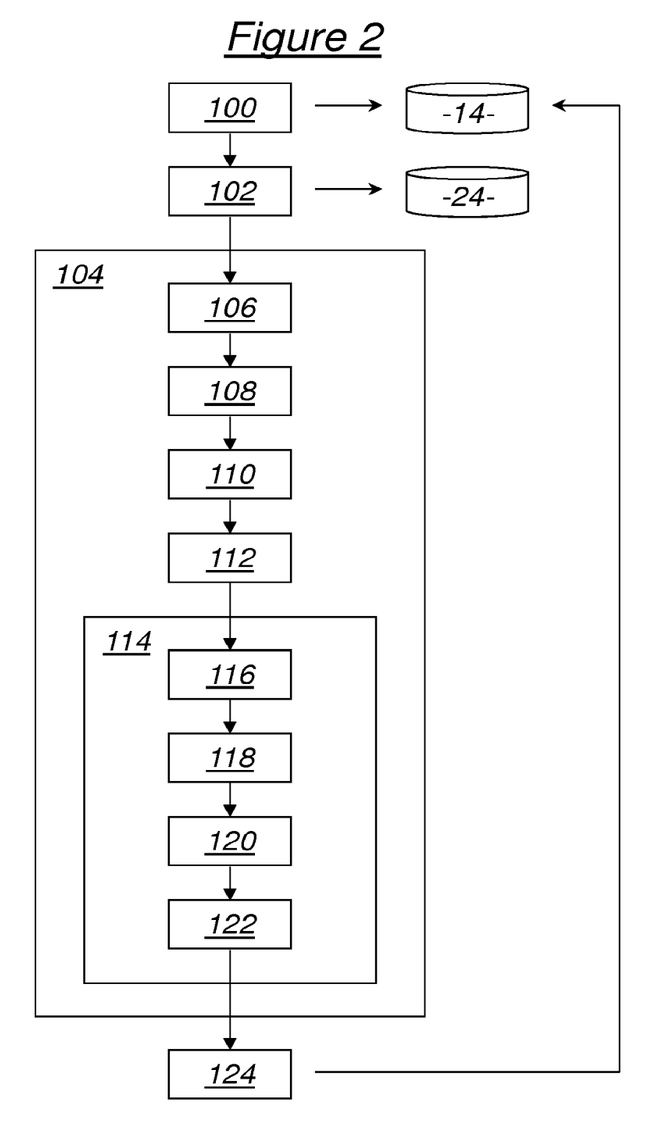
FIG. 2 illustrates the successive steps of a method implemented by the system of FIG. 1.

An example of operation of the system of FIG. 1 will now be described in reference to FIG. 2.

During a step 100 prior to any use of the system, the general database 14 is created. It contains a set of identified access points 12 capable of being contacted by any mobile client station such as the client station 16 on board the motor vehicle 18. It associates, with each of these identified access points 12, values related to the aforementioned connection information. It is accessible via the Internet 10 for reading, for downloads into onboard databases of client stations, and for writing, for updates via learning or feedback.

During a step 102 prior to any request for W-Fi access to the Internet 10, the download manager 28 is executed by the processor 22 of the mobile client station 16 for the downloading, into the onboard database 24, of the connection information of at least a portion of the access points of the general database 14. This download is carried out independently of any execution of the manager 30 of Internet 10 access.

In the example illustrated in FIG. 1 in which the mobile client station 16 is on board the motor vehicle 18, this can be carried out upon starting of the motor vehicle 18, for example when a user defines his/her travel path on an onboard computer. The identified access points in the general database 14 capable of being accessible at any given time during the travel path are then selected and their connection information is downloaded. The selection can also take into account a preferred Wi-Fi access provider. The download can be executed again at any time during the travel path, in particular when the latter is modified along the way.

At a given time during the travel time, the manager 30 of Internet 10 access of the mobile client station 16 requests Wi-Fi access to the Internet during a step 104.

This step 104 comprises five successive phases identified by the references 106, 108, 110, 112 and 114.

The first phase 106 involves browsing through at least a portion of the identified access points 12 in order to list those detected as accessible by the mobile client station 16. In order to significantly accelerate the Wi-Fi access, this browsing phase 106 is advantageously carried out on the basis of the previously downloaded connection information in the onboard database 24. In particular, according to the geographic location of the mobile client station 16 at the moment it executes this browsing phase 106, for example obtained via GPS (from "Global Positioning System"), the browsing through the accessible Wi-Fi access points can be carried out without soliciting the general database 14 and the identified access points 12 via simple comparison between the GPS location obtained and the location information or geographic coverage downloaded in onboard database 24. This browsing can also be carried out in advance by previously associating possible geographic locations of the mobile client station 16 with lists of accessible access points out of those downloaded during the step 102.

The second phase 108 involves selecting one of the access points listed during the browsing phase 106. In order to significantly accelerate the Wi-Fi access, this selection phase 108 is advantageously carried out on the basis of the previously downloaded connection information in the onboard database 24, without soliciting the general database 14 and the identified access points 12. Thanks to the aforementioned performance characteristics in particular, a ranking of the access points can be easily established, optionally even in advance. Moreover, in the case in which the identified access points in the general database 14 are divided into predetermined classes, the number of which is strictly less than the number of identified access points 12, this selection phase 108 can be further simplified. It thus comprises the selection of a class, then the final selection of an access point of this class out of the access points listed during the browsing phase 106. In order to prevent well-ranked access points from being over-contacted, the final selection is advantageously carried out randomly, pseudo-randomly (for example using a hash algorithm) or on the basis of information on loads of the access points listed.

The third phase 110 involves associating the mobile client station 16 with the access point selected during the second phase 108. This association phase 110 is known per se ad will not be described in detail. It mainly comprises the emission of an association request by the mobile client station 16 and the reception of an acknowledgement emitted by the selected access point in response to this request.

The fourth phase 112 involves authenticating the mobile client station 16 in the access point that was just associated with it. In a manner known per se, this authentication phase 112 comprises the use of parameters of time outs. But in general, these time outs are of approximately several tens of seconds, or even a minute. According to an advantageous embodiment of the invention, these time outs are reduced in such a way as to always be less than or equal to 5 seconds. Thus, the authentication phase 112 is statistically accelerated. As a non-limiting example, the authentication can be carried out using the EAP (from "Extensible Authentication Protocol") protocol.

The fifth phase 114 involves configuring the IP parameters of the mobile client station 16 and other conventional configuration parameters necessary for establishing an Internet 10 connection. It can be carried out using the DHCP protocol. In a manner known per se, this configuration phase 114 involves the use of parameters of time outs, in particular times of returns, called backoff times. But in general, these time outs are of approximately several seconds and the backoff times grow linearly or exponentially. According to an advantageous embodiment of the invention, these time outs are reduced in such a way as to always remain less than or equal to 500 milliseconds. As for the backoff times, they are defined in such a way as to remain constant. Thus, the configuration phase 114 is statistically accelerated.

More precisely, for example according to the DHCP protocol, the configuration phase 114 itself comprises four steps: broadcasting 116, by the mobile client station 16, of a request for an IP address in the network, then proposition 118 of an IP address for example by the Internet server 20, then request 120 for the proposed IP address, then acknowledgement 122 for validation of this IP address. In a manner known per se, this configuration phase can be executed several times in case of successive failures. According to an advantageous embodiment of the invention, during the first execution of this configuration phase 114 in the request for access 104, the two first steps of broadcasting 116 and proposing an IP address 118 are not carried out, and the step of requesting 120 the proposed IP address can be based on an IP address assigned during a previous request for access. This feature takes advantage of the fact that an IP address is generally allocated for a duration extending beyond the average duration of a Wi-Fi connection, especially when the latter is obtained in the context of FIG. 1, that is to say, for the mobile client station 16 on board the motor vehicle 18. Thus, the configuration phase 114 is statistically accelerated.

After the execution of the configuration phase 114, the step 104 of requesting Wi-Fi access to the Internet is completed and is followed by a step 124 of actual establishment of the Wi-Fi access of the mobile client station 16 to the Internet via the access point selected on the basis of the configured IP parameters. As indicated above, during the Wi-Fi connection obtained during the step 124, performance characteristics of the selected access point can be measured and transmitted to the general database 14 for an update.

It is clear that a system for establishing Internet access by using a wireless local area network communication protocol from a mobile client station such as that described above allows, through its operation also described above, the duration of a request for Wi-Fi access to the Internet to be substantially reduced. While in general a Wi-Fi access time is approximately 9 to 14 seconds, it can be reduced to at most 1.5 seconds, or even less than a second, thanks to the system described above.

This advantage is particularly important for uses where the client station is very mobile, in particular when it is on board a motor vehicle, because then the duration of a Wi-Fi connection can be very short, in particular approximately one or several tens of seconds in an urban environment.

It should also be noted that the invention is not limited to the embodiments described above.

In particular, the invention applies to wireless local area network communication protocols other than Wi-Fi.

More generally, it is clear to a person skilled in the art that various modifications can be made to the embodiments described above, in light of the teaching that has just been disclosed. In the following claims, the terms used must not be interpreted as limiting the claims to the embodiments disclosed in the present description, but must be interpreted to include all the equivalents that the claims are intended to cover through their wording and the provision of which is within the reach of a person skilled in the art when applying general knowledge to the implementation of the teaching that has just been disclosed.

The invention claimed is:

1. A method for establishing an Internet access by using a wireless local area network communication protocol from a mobile client station, via an access point to be chosen from a set of identified Internet access points using the protocol, comprising:

providing a general database containing all of the identified access points with connection information specific to each access point, wherein the connection information specific to each identified access point in the general database comprises: (a) a location or geographic coverage area of the each access point, and (b) performance characteristics of the each access point;

the mobile client station requesting Internet access by using the protocol, successively moving through: browsing through at least a portion of the identified access points to list those detected as accessible by the mobile client station; selecting one of the access points previously listed; requesting an association of the mobile client station with the selected access point; authenticating the mobile client station in the access point that was just associated with it; configuring IP parameters of the mobile client station;

establishing the Internet access of the mobile client station via the selected access point using the IP parameters configured;

wherein before the requesting the Internet access by using the protocol and independently, the mobile client station downloading the connection information of at least a portion of the access points of the general database into an onboard database of the mobile client station;

wherein the browsing through comprises browsing through based on the previously downloaded location or geographic coverage area of the access points in the connection information in the onboard database of the mobile client station, without soliciting the general database and the identified access points, and wherein the selecting comprises selecting the one of the access points based on the performance characteristics of the access points in the connection information in the onboard database of the mobile client station, without soliciting the general database and the identified access points, wherein the authentication and configuration of the IP parameters involve use of parameters of time outs that are defined to always be less than or equal to 5 seconds, times for returns, called backoff times, and defined in the configuring the IP parameters to further remain constant.

2. The method for establishing Internet access as claimed in claim 1, wherein the connection information specific to each identified access point in the general database further comprises:

a preferred communication channel of the access point in question according to the protocol.

3. The method for establishing Internet access as claimed in claim 1, wherein:

the identified access points in the general database are divided into predetermined classes, a number of which is strictly less than a number of identified access points, the selection comprises selection of a class, then selection of an access point from this class among the access points listed based on the previously downloaded connection information in the onboard database of the mobile client station, and the selection of an access point in the selected class is done randomly, pseudo-randomly, or based on information on loads of the access points listed.

4. The method for establishing Internet access as claimed in claim 1, further comprising, when the Internet access of the mobile client station via the selected access point has been established:

measuring performance characteristics of the selected access point based on the established access; and transmitting the performance characteristics measured to the general database for an update.

5. The method for establishing Internet access as claimed in claim 1, wherein the wireless local area network communication protocol is one of protocols normalized by IEEE 802.11.

6. The method for establishing Internet access as claimed in claim 1, wherein the configuration of the IP parameters of the mobile client station is carried out using DHCP protocol.

7. A method for establishing Internet access by using a wireless local area network communication protocol from a mobile client station, via an access point to be chosen from a set of identified Internet access points using the protocol, comprising:

providing a general database containing all of the identified access points with connection information specific to each access point, wherein the connection information specific to each identified access point in the general database comprises: (a) a location or geographic coverage area of the each access point, and (b) performance characteristics of the each access point;

the mobile client station requesting Internet access by using the protocol, successively moving through: browsing through at least a portion of the identified access points to list those detected as accessible by the mobile client station; selecting one of the access points previously listed; requesting an association of the mobile client station with the selected access point authenticating the mobile client station in the access point that was just associated with it configuring IP parameters of the mobile client station;

establishing the Internet access of the mobile client station via the selected access point using the IP parameters configured;

wherein before the requesting the Internet access by using the protocol and independently, the mobile client station downloading the connection information of at least a portion of the access points of the general database into an onboard database of the mobile client station;

wherein the browsing through comprises browsing through based on the previously downloaded location or geographic coverage area of the access points in the connection information in the onboard database of the mobile client station, without soliciting the general database and the identified access points, and wherein the selecting comprises selecting the one of the access points based on the performance characteristics of the access points in the connection information in the onboard database of the mobile client station, without soliciting the general database and the identified access points, wherein:

the configuring the IP parameters itself comprises four operations of: broadcasting, then proposing an IP address, then requesting the IP address proposed, then acknowledgement, and during first execution of the configuring the IP parameters in the request for access, the two first operations of broadcasting and proposing an IP address are not carried out, the requesting the proposed IP address being based on an IP address assigned during a previous request for access.

8. The method for establishing Internet access as claimed in claim 7, wherein the connection information specific to each identified access point in the general database further comprises:

a preferred communication channel of the access point in question according to the protocol.

9. The method for establishing Internet access as claimed in claim 7, wherein:

the identified access points in the general database are divided into predetermined classes, a number of which is strictly less than a number of identified access points, the selection comprises selection of a class, then selection of an access point from this class among the access points listed based on the previously downloaded connection information in the onboard database of the mobile client station, and the selection of an access point in the selected class is done randomly, pseudo-randomly, or based on information on loads of the access points listed.

10. The method for establishing Internet access as claimed in claim 7, further comprising, when the Internet access of the mobile client station via the selected access point has been established:

measuring performance characteristics of the selected access point based on the established access; and transmitting the performance characteristics measured to the general database for an update.

11. The method for establishing Internet access as claimed in claim 7, wherein the wireless local area network communication protocol is one of protocols normalized by IEEE 802.11.

12. The method for establishing Internet access as claimed in claim 7, wherein the configuration of the IP parameters of the mobile client station is carried out using DHCP protocol.

13. A non-transitory computer readable medium including a computer program that can be read by a computer and/or executed by a processor, comprising:
instructions for execution of a method for establishing Internet access by using a wireless local area network communication protocol from a mobile client station, via an access point to be chosen from a set of identified Internet access points using the protocol, when the program is executed on a processor of the mobile client station:
requesting Internet access for the mobile client station by using the protocol, by successively moving through: browsing through at least a portion of the identified access points to list those detected as accessible by the mobile client station; selecting one of the access points previously listed; requesting an association of the mobile client station with the selected access point; authenticating the mobile client station in the access point that was just associated with it; configuring IP parameters of the mobile client station;
participating in establishment of the Internet access of the mobile client station via the access point selected based on the IP parameters configured;
before the requesting the Internet access by using the protocol and independently, downloading, to the mobile client station, the connection information of at least a portion of the access points of the general database into an onboard database of the mobile client station, wherein the connection information specific to each identified access point in the general database comprises: (a) a location or geographic coverage area of the each access point, and (b) performance characteristics of the each access point;
wherein the browsing through comprises browsing through based on the previously downloaded location or geographic coverage area of the access points in the connection information in the onboard database of the mobile client station, without soliciting the general database and the identified access points, and
wherein the selecting comprises selecting the one of the access points based on the performance characteristics of the access points in the connection information in the onboard database of the mobile client station, without soliciting the general database and the identified access points,
wherein the authentication and configuration of the IP parameters involve use of parameters of time outs that are defined to always be less than or equal to 5 seconds, times for returns, called backoff times, and defined in the configuring the IP parameters to further remain constant.

14. A system for establishing an Internet access by using a wireless local area network communication protocol from a mobile client station, via an access point to be chosen from a set of identified Internet access points using the protocol, the system comprising:
a general database, accessible via the Internet, containing all of the identified access points with connection information specific to each access point, wherein the connection information specific to each identified access point in the general database comprises: (a) a location or geographic coverage area of the each access point, and (b) performance characteristics of the each access point;
at least one mobile client station comprising a processor and:
an onboard database,
in its onboard database, a manager of downloading of the connection information of at least a portion of the access points in the general database,
a manager of Internet access programmed to, when it is executed, request Internet access by using the protocol, by successively moving through: browsing through at least a portion of the identified access points to list those detected as accessible by the mobile client station; selecting one of the access points previously listed; requesting an association of the mobile client station with the selected access point; authenticating the mobile client station in the access point that was just associated with it; configuring IP parameters of the mobile client station;
an Internet server programmed to establish the Internet access of the mobile client station via the access point selected on the basis of the IP parameters configured;
wherein the processor of the mobile client station is further programmed to sequence the execution of the download manager and of the Internet access manager for:
executing the download manager independently of and before execution of the Internet access manager;
executing the Internet access manager by moving through the browsing through based on the location or geographic coverage area of the access points in the connection information in the onboard database of the mobile client station previously downloaded by the download manager, without soliciting the general database and the identified access points, and
wherein the selecting comprises selecting the one of the access points based on the performance characteristics of the each access point in the connection information in the onboard database of the mobile client station, without soliciting the general database and the identified access points,
wherein the authentication and configuration of the IP parameters involve use of parameters of time outs that are defined to always be less than or equal to 5 seconds, times for returns, called backoff times, and defined in the configuring the IP parameters to further remain constant.

15. A non-transitory computer readable medium including a computer program that can be read by a computer and/or executed by a processor, comprising:
instructions for execution of a method for establishing Internet access by using a wireless local area network communication protocol from a mobile client station, via an access point to be chosen from a set of identified Internet access points using the protocol, when the program is executed on a processor of the mobile client station:
requesting Internet access for the mobile client station by using the protocol, by successively moving through: browsing through at least a portion of the identified access points to list those detected as accessible by the mobile client station; selecting one of the access points previously listed; requesting an association of the mobile client station with the selected access point authenticating the mobile client station in the access point that was just associated with it configuring IP parameters of the mobile client station;

participating in establishment of the Internet access of the mobile client station via the access point selected based on the IP parameters configured;

before the requesting the Internet access by using the protocol and independently, downloading, to the mobile client station, the connection information of at least a portion of the access points of the general database into an onboard database of the mobile client station, wherein the connection information specific to each identified access point in the general database comprises: (a) a location or geographic coverage area of the each access point, and (b) performance characteristics of the each access point;

wherein the browsing through comprises browsing through based on the previously downloaded location or geographic coverage area of the access points in the connection information in the onboard database of the mobile client station, without soliciting the general database and the identified access points, and wherein the selecting comprises selecting the one of the access points based on the performance characteristics of the access points in the connection information in the onboard database of the mobile client station, without soliciting the general database and the identified access points, wherein:

the configuring the IP parameters itself comprises four operations of: broadcasting, then proposing an IP address, then requesting the IP address proposed, then acknowledgement, and during first execution of the configuring the IP parameters in the request for access, the two first operations of broadcasting and proposing an IP address are not carried out, the requesting the proposed IP address being based on an IP address assigned during a previous request for access.

16. A system for establishing an Internet access by using a wireless local area network communication protocol from a mobile client station, via an access point to be chosen from a set of identified Internet access points using the protocol, the system comprising:

a general database, accessible via the Internet, containing all of the identified access points with connection information specific to each access point, wherein the connection information specific to each identified access point in the general database comprises: (a) a location or geographic coverage area of the each access point, and (b) performance characteristics of the each access point;

at least one mobile client station comprising a processor and:

an onboard database, in its onboard database, a manager of downloading of the connection information of at least a portion of the access points in the general database, a manager of Internet access programmed to, when it is executed, request Internet access by using the protocol, by successively moving through: browsing through at least a portion of the identified access points to list those detected as accessible by the mobile client station; selecting one of the access points previously listed; requesting an association of the mobile client station with the selected access point authenticating the mobile client station in the access point that was just associated with it configuring IP parameters of the mobile client station;

an Internet server programmed to establish the Internet access of the mobile client station via the access point selected on the basis of the IP parameters configured;

wherein the processor of the mobile client station is further programmed to sequence the execution of the download manager and of the Internet access manager for:

executing the download manager independently of and before execution of the Internet access manager;

executing the Internet access manager by moving through the browsing through based on the location or geographic coverage area of the access points in the connection information in the onboard database of the mobile client station previously downloaded by the download manager, without soliciting the general database and the identified access points, and wherein the selecting comprises selecting the one of the access points based on the performance characteristics of the each access point in the connection information in the onboard database of the mobile client station, without soliciting the general database and the identified access points, wherein:

the configuring the IP parameters itself comprises four operations of: broadcasting, then proposing an IP address, then requesting the IP address proposed, then acknowledgement, and during first execution of the configuring the IP parameters in the request for access, the two first operations of broadcasting and proposing an IP address are not carried out, the requesting the proposed IP address being based on an IP address assigned during a previous request for access.

* * * * *